United States Patent
Mizoguchi et al.

(10) Patent No.: US 12,443,455 B2
(45) Date of Patent: Oct. 14, 2025

(54) ELECTRONIC CONTROL DEVICE

(71) Applicant: HITACHI ASTEMO, LTD., Hitachinaka (JP)

(72) Inventors: Masashi Mizoguchi, Tokyo (JP); Fumio Narisawa, Hitachinaka (JP); Hiroyuki Nakamura, Hitachinaka (JP); Tasuku Ishigooka, Tokyo (JP); Yuki Tanaka, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 729 days.

(21) Appl. No.: 17/774,540

(22) PCT Filed: Sep. 29, 2020

(86) PCT No.: PCT/JP2020/036781
§ 371 (c)(1),
(2) Date: May 5, 2022

(87) PCT Pub. No.: WO2021/106353
PCT Pub. Date: Jun. 3, 2021

(65) Prior Publication Data
US 2022/0398135 A1 Dec. 15, 2022

(30) Foreign Application Priority Data
Nov. 29, 2019 (JP) .................... 2019-216011

(51) Int. Cl.
*G06F 9/48* (2006.01)
*G06F 9/50* (2006.01)
*G06F 11/34* (2006.01)

(52) U.S. Cl.
CPC .......... *G06F 9/5038* (2013.01); *G06F 9/4806* (2013.01); *G06F 11/3419* (2013.01); *G06F 2209/5021* (2013.01)

(58) Field of Classification Search
CPC .... G06F 9/4818; G06F 9/4831; G06F 9/4881; G06F 11/2236; G06F 11/366; G06F 9/4837; G06F 9/485
See application file for complete search history.

(56) References Cited

U.S. PATENT DOCUMENTS 8,839,029 B2 * 9/2014 Yamada .............. G06F 11/1687
714/11
10,520,928 B2 * 12/2019 Izzo ................... G05B 19/0428
(Continued)

FOREIGN PATENT DOCUMENTS

EP 2192489 A1 * 6/2010 .......... G06F 11/1695
JP H08(1996)-95807 4/1996
(Continued)

OTHER PUBLICATIONS

International Search Report with English Translation and Written Opinion for Application No. PCT/JP2020/036781 dated Jan. 26, 2021 (7 pages).
(Continued)

*Primary Examiner* — Lewis A Bullock, Jr.
*Assistant Examiner* — John Robert Dakita Ewald
(74) *Attorney, Agent, or Firm* — Foley & Lardner LLP

(57) ABSTRACT

To appropriately execute a task by an electronic control device including a processor having a plurality of cores. An ECU 100 includes a multi-core CPU having a plurality of cores that execute a first task that has an execution time that varies depending on a processing amount every predetermined cycle and a second task that is higher in priority than the first task and is prohibited from being interrupted. The second task is set to be inexecutable simultaneously between the plurality of cores. A task allocation unit 11 generates a first plan. A diagnosis task planning unit 12 generates a second plan. Task processing units 10a and 10b execute the first task based on the first plan. A diagnosis task correction
(Continued)

unit 13 times a delay time of the first task executed by the task processing units 10*a* and 10*b*, and postpones the second task of the second plan to the subsequent executable timing in accordance with the timed delay time. A diagnosis unit 14 executes the second task for each core based on the second plan corrected by the diagnosis task correction unit 13.

7 Claims, 5 Drawing Sheets

(56) References Cited

U.S. PATENT DOCUMENTS

| | | | |
|---|---|---|---|
| 2010/0131741 A1 | | 5/2010 | Yamada et al. |
| 2021/0011759 A1* | | 1/2021 | Park .................... G06F 11/3419 |

FOREIGN PATENT DOCUMENTS

| | | | |
|---|---|---|---|
| JP | 4302414 B2 * | 7/2009 | |
| JP | 2010-097432 | 4/2010 | |
| JP | 2013-152636 | 8/2013 | |
| JP | 2013-167945 | 8/2013 | |
| JP | 2013167945 A * | 8/2013 | |
| JP | 2018-032062 | 3/2018 | |

OTHER PUBLICATIONS

Chinese Office Action issued in corresponding CN Patent Application No. 202080074301.2, dated Jun. 9, 2025 with English translation (23 pages).

\* cited by examiner

FIG. 2

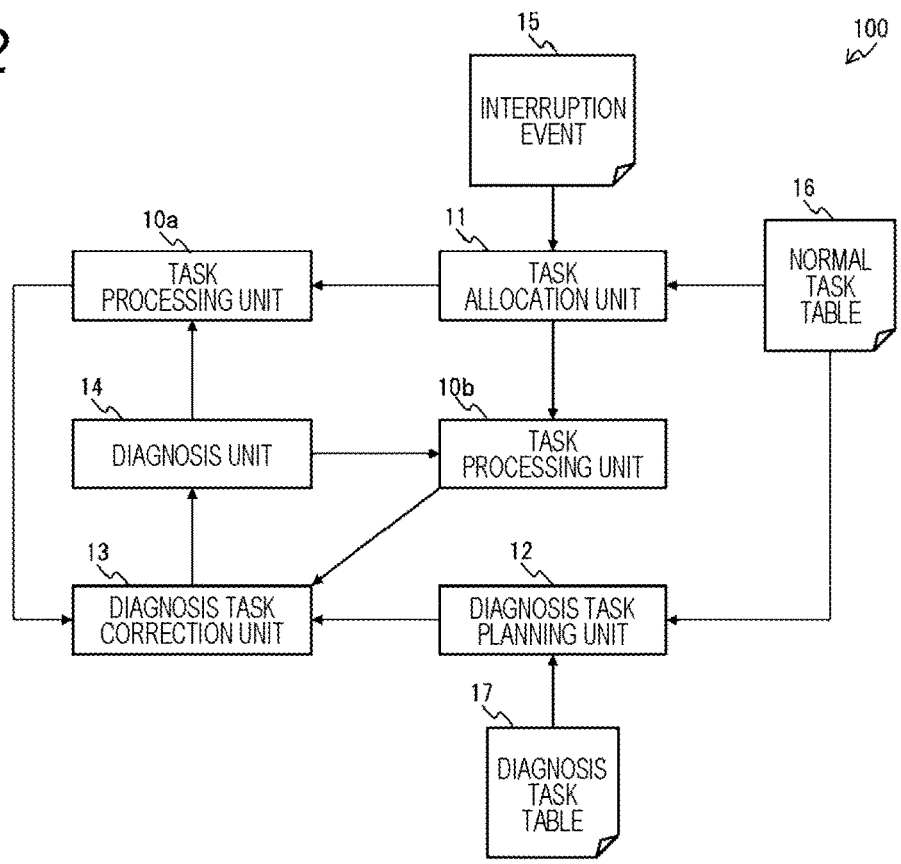

FIG. 3

| NORMAL TASK TABLE 16 | | | |
|---|---|---|---|
| ALLOCATED CORE 18 | PRIORITY WITHIN ALLOCATED CORE 19 | TASK NAME 20 | REQUIRED EXECUTION TIME DESIGN VALUE 21 |
| FIRST | 1 | INTER-MICROCOMPUTER COMMUNICATION TASK | 3ms |
| FIRST | 3 | DATA CONSISTENCY CHECK TASK | 1ms |
| FIRST | 4 | DATA INTEGRATION TASK | 1.5ms |
| SECOND | 1 | COLLISION AVOIDANCE TASK | 2ms |
| SECOND | 3 | TRAJECTORY GENERATION TASK | 4ms |

FIG. 4

| DIAGNOSIS TASK TABLE 17 | | | |
|---|---|---|---|
| ALLOCATED CORE 18 | PRIORITY WITHIN ALLOCATED CORE 19 | TASK NAME 20 | REQUIRED EXECUTION TIME DESIGN VALUE 21 |
| FIRST | 2 | FIRST CORE DIAGNOSIS TASK | 2ms |
| SECOND | 2 | SECOND CORE DIAGNOSIS TASK | 2ms |

# ELECTRONIC CONTROL DEVICE

TECHNICAL FIELD

The present invention relates to an electronic control device.

BACKGROUND ART

In order to execute processing with a high calculation load, an electronic control device including a multi-core CPU having a plurality of cores in one CPU has been adopted. A safety-critical product such as a vehicle-mounted electronic control device is required to confirm that each core is normally operating in order to ensure reliability. PTL 1 discloses a method for confirming that each core is normally operating by generating a large number of task start timing patterns within a constraint of the execution order of tasks for each core, executing the generated task start timing patterns as test items, and confirming the operation.

In particular, in an automatic driving system or the like, a constraint is often imposed on a failure detection time such as switching to a degeneration mode or stopping on a road shoulder within a predetermined time on the assumption of a failure occurring during operation of the system. Therefore, the microcomputer vendor recommends cyclically executing, within a time shorter than the time constraint, the core diagnosis task for confirming that the core operates normally. In a diagnosis method using a core diagnosis task, a diagnosis function module in the CPU often inputs a specific test pattern to a core to be diagnosed after stopping normal task processing, and compares an output result with a predetermined value.

CITATION LIST

Patent Literature

PTL 1: JP 2018-32062 A

SUMMARY OF INVENTION

Technical Problem

However, in this diagnosis method, the normal task processing is stopped, interruption is prohibited. Therefore, when the core diagnosis task overlaps the execution timing of a high-priority task, the priority is reversed. Since the core diagnosis task relates to the reliability of the electronic control device, it is required to set the priority to be high. However, as represented by an automatic driving system or the like, in a system that performs communication of important data among a plurality of subsystems, the timing at which data is transmitted from other subsystems is unknown, and therefore it is necessary to set the priority of a communication-related task to the highest so that data can be always received. In this case, the communication-related task has a higher priority than that of the core diagnosis task.

In general, rate-monotonic scheduling is publicly known as an optimal scheduling algorithm with a fixed priority. This rate-monotonic scheduling assumes that all tasks are interruptible. However, since the core diagnosis task is uninterruptible, it cannot be applied to rate-monotonic scheduling. That is, in the case of the publicly known scheduling method, there is a high possibility that an operation beyond the guarantee such as loss of communication data occurs.

The present invention has been made to solve the above problems, and it is an object of the present invention to provide a technique capable of appropriately executing a task by an electronic control device including a processor having a plurality of cores.

Solution to Problem

In order to solve the above object, an electronic control device according to the present invention includes: a processor that includes a plurality of cores that execute a first task that has an execution time that varies depending on a processing amount every predetermined cycle and a second task that is lower in priority than the first task and is prohibited from being interrupted, in which the second task is set to be inexecutable simultaneously between the plurality of cores, and the electronic control device includes a first planning unit that generates a first plan in which the first task is allocated to each of the cores, a second planning unit that generates a second plan in which the second task is allocated to each of the cores at an executable timing at which the first task is not being executed, a first execution unit that executes the first task based on the first plan unit, a correction unit that times a delay time of the first task executed by the first execution unit and postpones, in accordance with the timed delay time, the second task of the second plan to the executable timing that is subsequent, and a second execution unit that executes the second task for each of the cores based on the second plan corrected by the correction unit.

Advantageous Effects of Invention

According to the present invention, it is possible to execute a second task at a timing not overlapping a first task even if the first task is delayed, it is possible to appropriately execute the task by the electronic control device including a processor having a plurality of cores.

BRIEF DESCRIPTION OF DRAWINGS

FIG. 2 is a functional block diagram of the ECU.
FIG. 3 is an example of a normal task table.
FIG. 4 is an example of a diagnosis task table.

DESCRIPTION OF EMBODIMENTS

The present example relates to an electronic control device that has a multi-core CPU. In particular, a vehicle-mounted electronic control device has a constraint in failure detection time, and executes, for example, an inter-microcomputer communication task, a collision avoidance task, and a core diagnosis task at predetermined cycles. An example will be described in which the inter-microcomputer communication task is a task higher in priority than the core diagnosis task and the core diagnosis task is uninterruptible.

An embodiment will be described below with reference to the drawings.

<Hardware Configuration>

Figure 1:
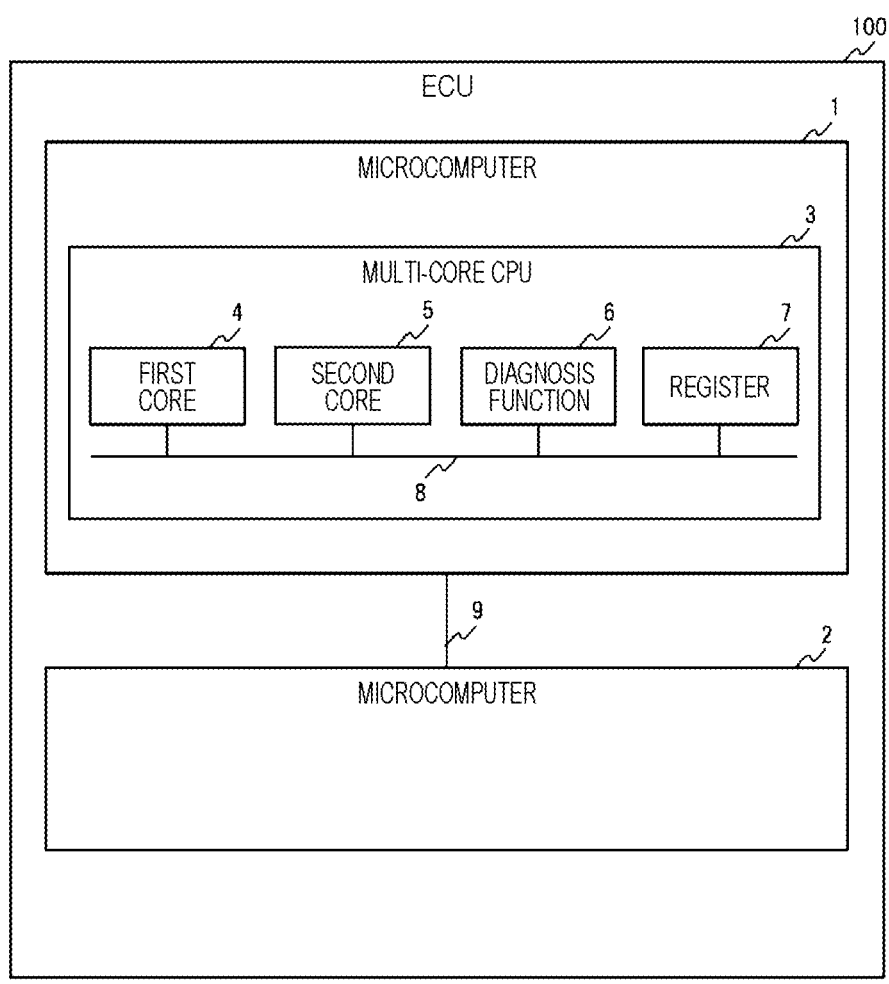
FIG. 1 is a configuration diagram of an ECU.

FIG. 1 is a configuration diagram of an ECU.

An electronic control unit (ECU) 100 as an example of "electronic control device" is mounted on a vehicle and controls another vehicle-mounted device. The ECU 100 incorporates a microcomputer 1 as an example of "computer" and a microcomputer 2 as an example of "different computer". The microcomputer 1 has a multi-core CPU 3 as an example of "processor" and integrates various data. The multi-core CPU includes a first core 4, a second core 5, a diagnosis function module 6, and a register 7. The first core 4, the second core 5, the diagnosis function module 6, and the register 7 are communicably connected to one another via a bus 8. The microcomputer 2 controls a sensor and a motor mounted on the vehicle, and acquires various data from the sensor and the motor. The various data acquired by the microcomputer 2 are, for example, images and moving images captured by a vehicle-mounted camera. The number of cores of the multi-core CPU 3 may be three or more. The microcomputer 2 only needs to have a CPU, and may have or needs not have a multi-core CPU.

The microcomputer 1 and the microcomputer 2 are communicably connected to each other via an inter-microcomputer communication channel 9 as an example of "communication channel". The inter-microcomputer communication channel 9 transmits data between the microcomputer 1 and the microcomputer 2. The inter-microcomputer communication channel 9 is one or more physical signal lines. The communication may be serial communication or parallel communication, and the communication method and protocol may be any publicly known technique.

The first core 4 executes an inter-microcomputer communication task as an example of "first task" that has an execution time that varies depending on a processing amount (communication amount) for each predetermined cycle, and a first core diagnosis task as an example of "second task" that is lower in priority than the inter-microcomputer communication task and is prohibited from being interrupted. The inter-microcomputer communication task is a task of transmitting and receiving data between the microcomputer 1 and the microcomputer 2 via the inter-microcomputer communication channel 9. The first core diagnosis task is a task of diagnosing failure of the first core 4.

The second core 5 executes a collision avoidance task as an example of "first task" and a second core diagnosis task as an example of "second task" that is lower in priority than the collision avoidance task and is prohibited from being interrupted. The collision avoidance task is a task for avoiding the vehicle from colliding with another obstacle. The second core diagnosis task is a task of diagnosing failure of the second core 5.

Here, the first core diagnosis task and the second core diagnosis task are set to be inexecutable simultaneously between the first core 4 and the second core 5. The inter-microcomputer communication task and the collision avoidance task may be set to be unable to start executing simultaneously between the first core 4 and the second core 5.

<Functional Block Diagram>

FIG. 2 is a functional block diagram of the ECU.

The ECU 100 includes task processing units 10a and 10b as examples of "first execution unit", a task allocation unit 11 as an example of "first planning unit", a diagnosis task planning unit 12 as an example of "second planning unit", a diagnosis task correction unit 13 as an example of "correction unit", and a diagnosis unit 14 as an example of "second execution unit". The task processing unit 10a corresponds to the first core 4 in FIG. 1, the task processing unit 10b corresponds to the second core 5 in FIG. 1, and the task allocation unit 11, the diagnosis task planning unit 12, the diagnosis task correction unit 13, and the diagnosis unit 14 correspond to the diagnosis function module 6 in FIG. 1. In the present example, since the multi-core CPU 3 includes two cores of the first core 4 and the second core 5, the multi-core CPU 3 includes two task processing units 10a and 10b.

The task allocation unit 11 determines a task to be executed by each of the task processing units 10a and 10b based on an interruption event 15 for executing a normal task other than a diagnosis task having a higher priority and a normal task table 16 for managing the normal task. Specifically, the task allocation unit 11 generates a first plan in which the inter-microcomputer communication task is allocated to the first core 4 and the collision avoidance task is allocated to the second core 5.

The diagnosis task planning unit 12 plans the timing at which each of the cores 4 and 5 starts the core diagnosis task based on the normal task table 16 (FIG. 3) and a diagnosis task table 17 (FIG. 4) for managing the diagnosis task. Specifically, the diagnosis task planning unit 12 generates a second plan in which the core diagnosis task is allocated to each of the cores 4 and 5 at an executable timing at which the first core 4 is not executing the inter-microcomputer communication task and the second core 5 is not executing the collision avoidance task.

The diagnosis task correction unit 13 corrects the start timing of the core diagnosis task generated by the diagnosis task planning unit 12. Specifically, the diagnosis task correction unit 13 times the delay time of each of the inter-microcomputer communication task executed by the task processing unit 10a and the collision avoidance task executed by the task processing unit 10b based on the first plan, and postpones the core diagnosis task of the second plan to a subsequent executable timing in accordance with the timed delay time.

The diagnosis unit 14 executes the core diagnosis task for each of the task processing units 10a and 10 based on the second plan corrected by the diagnosis task correction unit 13. Specifically, the diagnosis unit 14 causes one of the first core 4 and the second core 5 to transmit the core diagnosis task to the other, causes the other to transmit a reply result to one and compare the transmitted reply result with a predetermined expectation value, and diagnoses the failure of the first core 4 and the second core 5. This allows the failure of the first core 4 and the second core 5 to be diagnosed between the first core 4 and the second core 5. At this time, the diagnosis unit 14 causes each of the task processing units 10a and 10b in execution of the core diagnosis task to prohibit execution of another task. That is, the diagnosis unit 14 prohibits interruption of another task for the core diagnosis task.

<Normal Task Table 16>

FIG. 3 is an example of a normal task table.

The normal task table 16 includes, for each task other than the core diagnosis task, an allocated core 18, a priority 19 in the allocated core (hereinafter, also referred to as priority), a task name 20, and a required execution time design value 21 as an example of "execution time".

The allocated core 18 is the name or ID of a core allocated at the time of designing the task for each task. The allocated cores 18 are set to "first" corresponding to the first core 4 and "second" corresponding to the second core 5. The priority 19 in the allocated core is a priority order among tasks allocated to the same core. For example, the priority 19 is in a range of "1" to "4".

As illustrated in FIG. 4, in the present example, the priority of the core diagnosis task is set to "2" in the first core 4 and the second core 5. Therefore, "2" is a missing number in the field of the priority 19 in the allocated core of the normal task table 16.

The task name 20 is the name or ID of the task determined at the time of designing the task. The task names are "inter-microcomputer communication task", "data consistency check task", "data integration task", "collision avoidance task", and "startup generation task".

The required execution time design value 21 is a design value of the required execution time as an example of "execution time" of each task assumed at the task design stage. The required execution time design value 21 may be appropriately selected based on an index such as a mean value or a median value in the case of a task having a large variation in the required execution time. In the present example, the inter-microcomputer communication task is a task having a larger variation in the required execution time in accordance with the data communication amount than that of the core diagnosis task. For the inter-microcomputer communication task in the present example, the required execution time design value 21 may be set to a time required at the time of communicating a data amount 1.5 times the mean value of the upper limit and the lower limit of the communication amount defined as the design value. The required execution time design value 21 of the inter-microcomputer communication task is, for example, 3 ms.

<Diagnosis Task Table 17>

FIG. 4 is an example of the diagnosis task table 17.

Similarly to the normal task table 16, the diagnosis task table 17 includes, for each core diagnosis task, the allocated core 18, the priority 19 in the allocated core, the task name 20, and the required execution time design value 21.

In the diagnosis task table 17, the priority 19 is set to "2", the task names 20 are "first core diagnosis task" executed by the first core 4 and "second core diagnosis task" executed by the second core 5, and the required execution time design value 21 is set to "2 ms".

<Task Allocation Unit 11>

Here, generation processing of the first plan by the task allocation unit 11 will be described.

The task allocation unit 11 refers to the normal task table 16 to allocate a short execution cycle in order from a task having a higher priority. Due to this, the task allocation unit 11 determines the timing to execute processing of the task for each of the cores 4 and 5. The task allocation unit 11 of the present example allocates, in the first core 4, a 10 ms cycle to the inter-microcomputer communication task, a 20 ms cycle to the data consistency check task, a 30 ms cycle to the data integration task, and, in the second core 5, a 10 ms cycle to the collision avoidance task and a 20 ms cycle to the track generation task.

Figure 5:
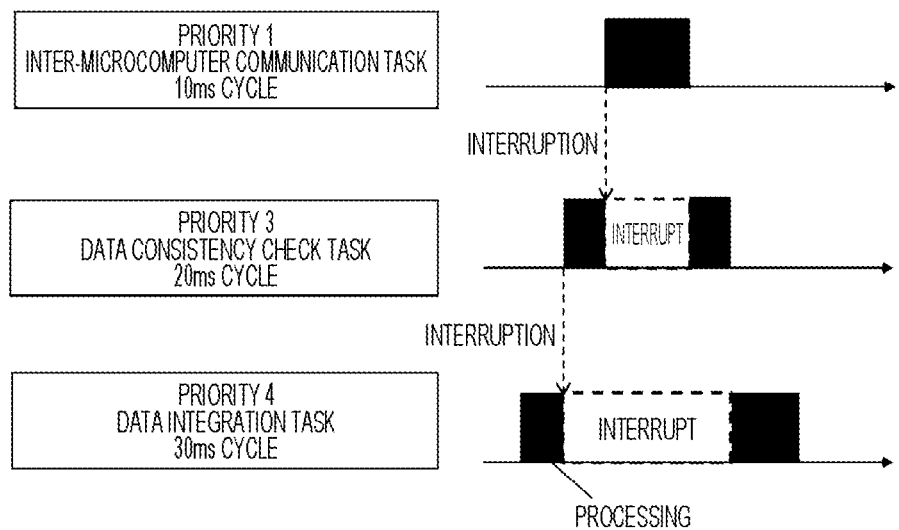
FIG. 5 is an execution example by rate-monotonic scheduling.

FIG. 5 is an execution example by rate-monotonic scheduling.

For example, in the first core 4, the interruption event 15 occurs when timing to process the data consistency check task having the priority "3" comes during the processing of the data integration task having the priority "4". In this case, the first core 4 interrupts the data integration task and executes the data consistency check task higher in priority than the data integration task. In the first core 4, another interruption event 15 occurs when timing to process the inter-microcomputer communication task having the priority "1" comes during the processing of the data consistency check task having the priority "3". In this case, the first core 4 interrupts the data consistency check task and executes the inter-microcomputer communication task higher in priority than the data consistency check task.

Next, the first core 4 resumes the data consistency check task after the inter-microcomputer communication task ends, and resumes the data integration task after the data consistency check task ends.

That is, the first core 4 resumes the data integration task after the tasks (the data consistency check task and the inter-microcomputer communication task) higher in priority than all the data integration tasks end. This approach is publicly known as rate-monotonic scheduling. The task allocation unit 11 may determine the processing timing of the task by a scheduling algorithm other than rate-monotonic scheduling.

<Diagnosis Task Planning Unit 12>

Next, generation processing of the second plan by the diagnosis task planning unit 12 will be described.

Figure 6:
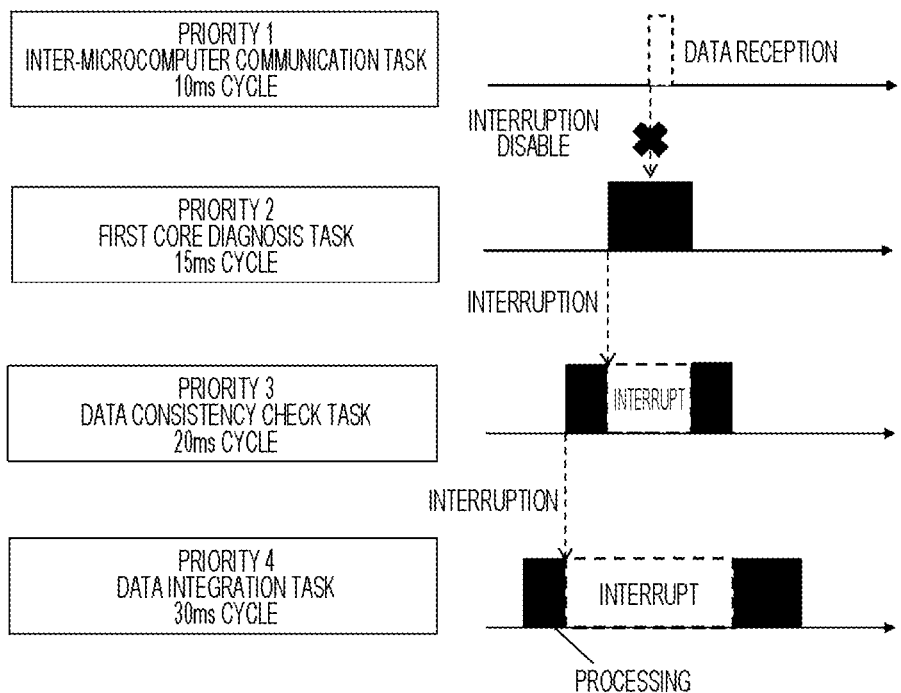
FIG. 6 is an execution example for explaining interruption prohibition by monotonic scheduling.

FIG. 6 is an execution example for explaining interruption prohibition by monotonic scheduling.

In FIG. 6, an example in which the first core diagnosis task is allocated to the first core 4 by rate-monotonic scheduling will be described.

For example, the first core 4 cannot execute the inter-microcomputer communication task having the priority "1" because when the processing timing of the inter-microcomputer communication task having the priority "1" overlaps during execution of the first core diagnosis task having the priority "2", interruption is prohibited during execution of the first core diagnosis task. For this reason, an out-of-guarantee operation such as data loss occurs in the microcomputer 1. Therefore, the diagnosis task planning unit 12 generates the second plan in which the core diagnosis task is allocated to the core 4 so as to execute the core diagnosis task at a timing not overlapping the processing timing of the task higher in priority than the core diagnosis task.

Figure 7:
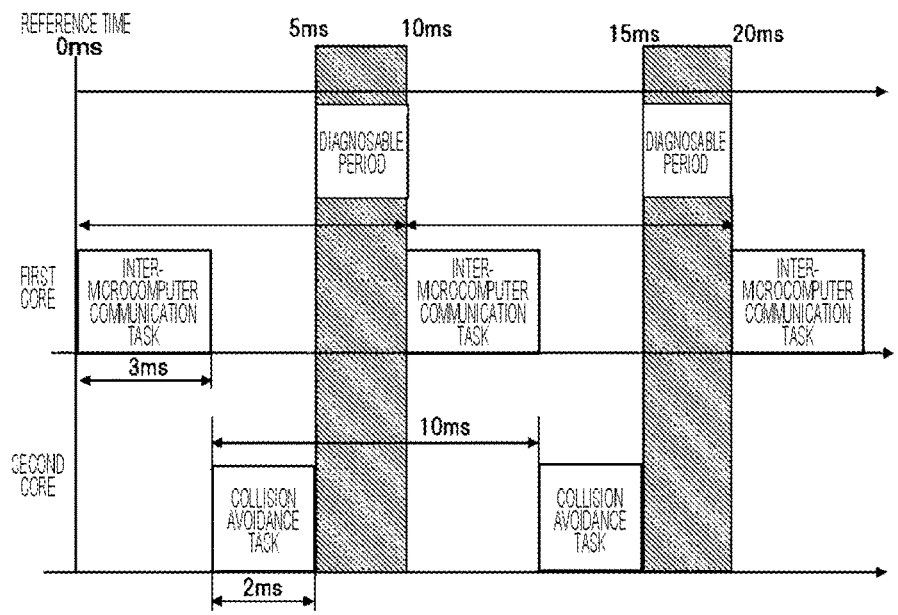
FIG. 7 is a timing chart illustrating a first plan.

FIG. 7 is a timing chart illustrating the first plan.

The first core 4 executes the inter-microcomputer communication task having the priority "1" at a reference time 0 ms. The second core 5 executes the collision avoidance task having the priority "1" at a time of 3 ms. The cores 4 and 5 can process the core diagnosis task without overlapping the inter-microcomputer communication task and the collision avoidance task having the priority "1" between times 5 ms and 10 ms and between times 15 ms and 20 ms, respectively.

Thus, each of the cores 4 and 5 has a timing at which the core diagnosis task can be processed every 10 ms.

Figure 8:
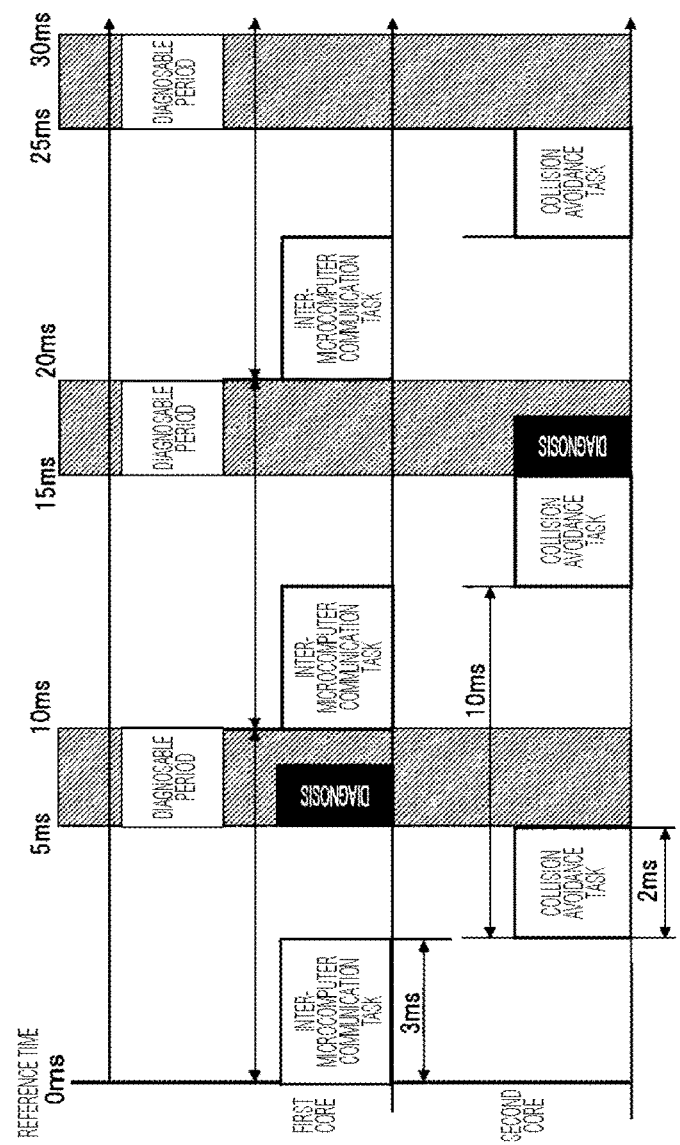
FIG. 8 is a timing chart illustrating a second plan at a normal time.

FIG. 8 is a timing chart illustrating the second plan at the normal time.

Therefore, as illustrated in FIG. 8, the diagnosis task planning unit 12 generates the second plan with the diagnosis start timing of the first core 4 as 20n−15 [ms] and the diagnosis start timing of the second core 5 as 20n−5 [ms] (n is a natural number).

<Diagnosis Task Correction Unit 13>

By correcting the start timing of the core diagnosis task generated by the diagnosis task planning unit 12, the diagnosis task correction unit 13 corrects the second plan in accordance with the delay time of the inter-microcomputer communication task and the collision avoidance task executed by the task processing units 10a and 10b, respectively, based on the first plan. The delay time is only required to be the startup deviation time of the cores 4 and 5 corresponding to the task processing units 10a and 10b, respectively, or the required execution time delayed in accordance with an actual operation status as an example of "actual required execution time".

In the present example, as a constraint on failure detection time, it is necessary to detect a failure within 30 ms after an abnormality occurs in the first core 4 or the second core 5. In this case, each of the cores 4 and 5 can process the core diagnosis task between 25 ms and 30 ms. However, since each of the cores 4 and 5 has the constraint of failure detection time within 30 ms, it is not necessary to process the core diagnosis task at this timing. That is, 5 ms from 25 ms to 30 ms is an idle time during which the core diagnosis task is not processed.

The diagnosis task correction unit 13 can correct the diagnosis start timing using this idle time.

Figure 9:
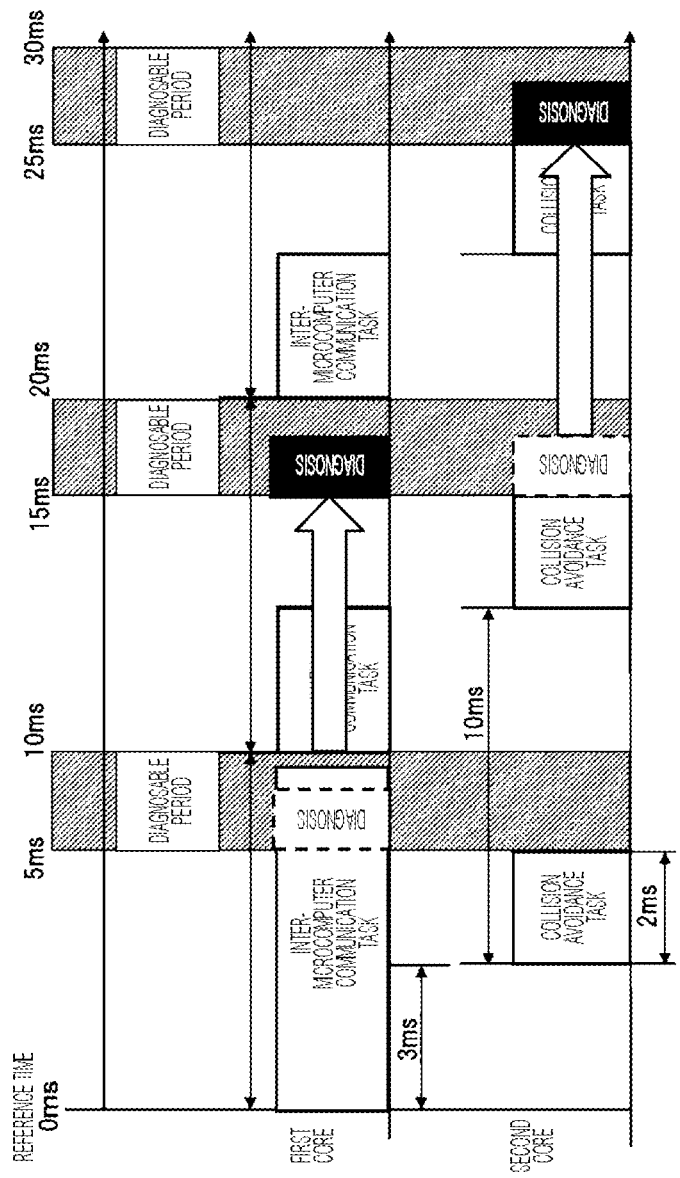
FIG. 9 is a timing chart illustrating the second plan at a time when a delay occurs.

FIG. 9 is a timing chart illustrating the second plan at a time when a delay occurs.

For example, when a large amount of inter-microcomputer communication data is received at the timing of the reference time 0, it is assumed for the first core 4 to take 9.0 ms to execute the inter-microcomputer communication task having the required execution time design value of 3.0 ms. Since the first core diagnosis task requires 2.0 ms, if it is executed as it is as per the second plan, the timing of the first core diagnosis task overlaps the timing of the next inter-microcomputer communication task. Therefore, the diagnosis task correction unit 13 shifts the start timings of the first core diagnosis task and the second core diagnosis task 10 ms after those of the second plan, and corrects the start timing of the first core diagnosis task to 20n−5 [ms] and the start timing of the second core diagnosis task to 20n+5 [ms] (n is a natural number). That is, the diagnosis task correction unit 13 postpones each of the first core diagnosis task and the second core diagnosis task to the next diagnosable timing.

When referring to the constraint of failure detection time at the time of planning the start timing of the core diagnosis task, the diagnosis task correction unit 13 can shift by 10 ms up to one time during the latest 30 ms. If the next inter-microcomputer communication task also requires an execution time exceeding 8.0 ms, the diagnosis task correction unit 13 cannot achieve the constraint of failure detection time, and therefore the multi-core CPU 3 may be notified of an abnormality occurrence and may shift the mode to a degeneration mode or a predetermined abnormality detection handling mode such as shutdown.

According to this configuration, the ECU 100 includes the multi-core CPU 3 having the first core 4 and the second core 5 that execute the inter-microcomputer communication task and the collision avoidance task that have execution times varying depending on the communication amount every predetermined cycle, and the first core diagnosis task and the second core diagnosis task that are lower in priority than the inter-microcomputer communication task and the collision avoidance task and is prohibited from being interrupted. The first core diagnosis task and the second core diagnosis task are set to be disabled simultaneously between the first core 4 and the second core 5. The ECU 100 includes the task allocation unit 11, the diagnosis task planning unit 12, the task processing units 10a and 10b, the diagnosis task correction unit 13, and the diagnosis unit 14. The task allocation unit 11 generates a first plan in which the inter-microcomputer communication task is allocated to the first core 4 and the collision avoidance task is allocated to the second core 5. The diagnosis task planning unit 12 generates the second plan in which the first core diagnosis task is allocated to the first core 4 and the second core diagnosis is allocated to the second core 5 at an executable timing at which the inter-microcomputer communication task and the collision avoidance task are not being executed. The task processing unit 10a executes the inter-microcomputer communication task based on the first plan, and the task processing unit 10b executes the collision avoidance task based on the first plan. The diagnosis task correction unit 13 times the delay time of the inter-microcomputer communication task and the collision avoidance task executed by the task processing units 10a and 10b, and postpones the first core diagnosis task and the second core diagnosis task of the second plan to subsequent executable timing in accordance with the timed delay time. The diagnosis unit 14 executes the first core diagnosis task in the first core 4 and the second core diagnosis in the second core 5 based on the second plan corrected by the diagnosis task correction unit 13. Due to this, even if the inter-microcomputer communication task or the collision avoidance task is delayed, the first core diagnosis task and the second core diagnosis task can be executed at a timing not overlapping the inter-microcomputer communication task and the collision avoidance task, and therefore the execution time of the first core diagnosis task and the second diagnosis task can be secured while maintaining the priority for each task. Therefore, the task can be appropriately executed by the ECU 100 that includes the multi-core CPU 3 having the first core 4 and the second core 5.

The microcomputer 1 having the multi-core CPU 3 and the inter-microcomputer communication channel 9 connecting the microcomputer 1 and the microcomputer 2 are included, and a task having an execution time varying in accordance with the communication amount every predetermined cycle includes an inter-microcomputer communication diagnosis task transmitted and received between the microcomputer 1 and the microcomputer 2 via the inter-microcomputer communication channel 9. This makes it possible to maintain the priority of communication between the microcomputer 1 and the microcomputer 2.

The tasks lower in priority than the inter-microcomputer communication task and the collision avoidance task and prohibited from being interrupted are the first core diagnosis task and the second core diagnosis task that have constraint in the failure detection time for the first core 4 and the second core 5. This allows the first core 4 and the second core 5 to execute the first core diagnosis task and the second core diagnosis task without overlapping the execution time of the inter-microcomputer communication task and the collision avoidance task, and to satisfy the constraint of failure detection time. As a result, the reliability of the operation of the ECU 100 can be improved.

The delay time is a startup deviation time of the first core 4 and the second core 5, or an actual required execution time of the inter-microcomputer communication task and the collision avoidance task. This makes it possible to appropriately execute the first core diagnosis task and the second diagnosis task even if the startup of the first core 4 and the second core 5 is delayed or the required execution time of the inter-microcomputer communication task and the collision avoidance task is prolonged.

The diagnosis task correction unit 13 postpones the first core diagnosis task and the second core diagnosis task to the earliest executable timing among a plurality of subsequent executable timings. This makes it possible to shorten the interval of the execution time of the first core diagnosis task and the interval of the execution time of the second core diagnosis task, and satisfy the constraint in failure detection time.

In a case where the execution timings of the first core diagnosis task postponed in the first core 3 and the second core diagnosis task of the second core 5 overlap each other, the diagnosis task correction unit 13 postpones the second core diagnosis task of the second core 5 to a subsequent executable timing. This makes it possible to satisfy both the constraint in the failure detection time of the first core diagnosis task in the first core 3 and the constraint in the failure detection time of the second core diagnosis task in the second core 5.

The present invention is not limited to the above-described example, and includes various modifications.

For example, the diagnosis task planning unit 12 may change the failure detection time in accordance with the traveling state of the vehicle. Specifically, when an urban area mode in which the vehicle travels in an urban area and a high-speed mode in which the vehicle travels on an expressway can be selected, the ECU 100 sets the failure detection time in the high-speed mode to be shorter than that in the urban area mode. At this time, the inter-microcomputer communication task in the high-speed mode may be set to 1 ms. This allows the inter-microcomputer communication task to be appropriately executed in accordance with the traveling state of the vehicle.

The diagnosis task planning unit 12 first allocates the first core diagnosis task or the second core diagnosis task to a core having a longer execution time of the communication task of the first core 4 and the second core 5. This makes it possible to easily allocate the first core diagnosis task or the second core diagnosis task to the core having a longer execution time.

For example, in a case where the execution times of the first core diagnosis task and the second core diagnosis task are different, the diagnosis task planning unit 12 may first allocate the first core diagnosis task or the second core diagnosis task to the first core 4 or the second core that executes a core diagnosis task having a longer execution time of the first core diagnosis task and the second core diagnosis task. This makes it possible to easily allocate a diagnosis task having a longer execution time to the first core 4 or the second core 5, and appropriately execute the first core diagnosis task and the second core diagnosis task.

The ECU 100 needs not include the microcomputer 2 and the inter-microcomputer communication channel 9 when setting a task other than the inter-microcomputer communication task as a task higher in priority than the core diagnosis task.

REFERENCE SIGNS LIST

1 microcomputer
2 microcomputer
3 multi-core CPU
4 first core
5 second core
9 inter-microcomputer communication channel
10*a* task processing unit
10*b* task processing unit
11 task allocation unit
12 diagnosis task planning unit
13 diagnosis task correction unit
14 diagnosis unit
100 ECU

The invention claimed is:

1. An electronic control device comprising:
a processor that includes a plurality of cores configured to execute:
first tasks that has an execution time that varies depending on a processing amount every predetermined cycle; and
a second task that is lower in priority than the first tasks and is prohibited from being interrupted, wherein the second task comprises a core diagnosis task that has a constraint in failure detection time for the plurality of cores, wherein the constraint in failure detection time corresponds to a constraint on a time interval to detect a failure after abnormality occurs in one of the plurality of cores,
wherein the second task is set to be inexecutable simultaneously between the plurality of cores, and
the electronic control device is configured to generate a first plan in which a respective first task of the first tasks is allocated to each of the cores,
the electronic control device is configured to generate a second plan in which the second task is allocated to each of the cores at an executable timing at which the first task is not being executed,
the plurality of cores are configured to execute the first tasks based on the first plan,
the electronic control device is configured to determine that when a delay in the execution of the first executed tasks has occurred by a delay amount of time to thereby postpone, in accordance with a shift amount of time, the future executable timing periods of the second task in a correction to the second plan, and
the electronic control device is configured to execute the second task for each of the cores based on the corrected second plan, wherein the electronic control device controlling a vehicle,
wherein the electronic control device is configured to change the failure detection time in accordance with a travel environment of the vehicle.

2. The electronic control device according to claim 1, comprising:
a computer that comprises the processor; and
a communication channel that connects the computer and another computer, wherein
the respective first task comprises a communication task transmitted and received between the computer and the other computer via the communication channel.

3. The electronic control device according to claim 1, wherein the delay time is a startup deviation time of the plurality of cores or an actual required execution time of the first tasks.

4. The electronic control device according to claim 1, wherein the core diagnosis task is postponed to an earliest executable timing among a plurality of the subsequent executable timings.

5. The electronic control device according to claim 1, wherein
the plurality of cores include a first core and a second core, and
in response to determining that execution timings of the core diagnosis task postponed in the first core and the core diagnosis task of the second core overlap, the electronic control device is configured to postpone the core diagnosis task of the second core to the subsequent executable timing so that the second task is set to be inexecutable simultaneously between the plurality of cores.

6. The electronic control device according to claim 5, wherein one of the first core and second core is configured to transmit the core diagnosis task to the other, causes the other to transmit a reply result to the one and compare a transmitted reply result with a predetermined expectation result, and diagnoses a failure of the first core and the second core.

7. The electronic control device according to claim 1, wherein the electronic control device is configured to first allocate the core diagnosis task to a core that executes a core diagnosis task in which the execution time is longer than that of another task of the plurality of core diagnosis tasks.

* * * * *